(12) United States Patent
Angelsmark et al.

(10) Patent No.: US 10,594,654 B2
(45) Date of Patent: Mar. 17, 2020

(54) DATA PROTECTION CONTROL

(71) Applicant: Telefonaktiebolaget LM Ericsson (publ), Stockholm (SE)

(72) Inventors: Ola Angelsmark, Ystad (SE); Per Persson, Södra Sandby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/562,062

(22) PCT Filed: May 26, 2015

(86) PCT No.: PCT/EP2015/061537
§ 371 (c)(1),
(2) Date: Sep. 27, 2017

(87) PCT Pub. No.: WO2016/188560
PCT Pub. Date: Dec. 1, 2016

(65) Prior Publication Data
US 2018/0069834 A1    Mar. 8, 2018

(51) Int. Cl.
*H04L 29/06*    (2006.01)
(52) U.S. Cl.
CPC .......... *H04L 63/0227* (2013.01); *H04L 63/02* (2013.01); *H04L 63/10* (2013.01);
(Continued)
(58) Field of Classification Search
CPC ..... H04L 63/0227; H04L 63/02; H04L 63/14; H04L 63/10; H04L 63/12; H04L 63/20; H04L 63/0272
See application file for complete search history.

(56) References Cited

U.S. PATENT DOCUMENTS 7,512,985 B1    3/2009   Grabamick et al.
8,938,775 B1 *  1/2015   Roth ................... G06F 21/606
                                                                  726/1
(Continued)

OTHER PUBLICATIONS

Takabi et al., "Security and Privacy Challenges in Cloud Computing Environments", IEEE Security & Privacy, vol. 8, Issue: 6, Nov.-Dec. (Year: 2010).*

*Primary Examiner* — Morshed Mehedi
(74) *Attorney, Agent, or Firm* — Coats + Bennett, PLLC (57) ABSTRACT

The invention relates to the field of data processing in a distributed environment, and more particularly control of movement of data and processes so as to achieve a protection that ensures that sensitive data and processes is not moved to untrusted domains. This is achieved by a method and apparatus for tagging of data with a trust level, comprising configuring a data analysis policy for mapping data elements to one of a number of trust levels; receiving a data flow; inspecting the data flow and identifying data elements to be tagged; for a data element to be tagged, analyzing the data element and mapping it to a trust level according to the data analysis policy; and adding the mapped trust level to the data element. This is further achieved by a method and apparatus for data protection, comprising: within a domain as defined by a boundary (10) within which controlled trust levels prevail, starting a service request with associated data to be processed; inspecting a trust level of the data; locating a processing unit (PU) having an associated trust level. Depending on the location of the processing unit within or without the domain, and on the trust level of the located processing unit relative to the trust level of the data, the data is sent out from the domain to the processing unit for processing; or sent to the processing unit configured inside the domain for processing; or the trust level of the data is downgraded to be equal or less than the trust level of the (Continued)

processing unit, and the downgraded data is sent out from the domain to the processing unit for processing.

13 Claims, 7 Drawing Sheets

(52) U.S. Cl.
CPC .............. *H04L 63/12* (2013.01); *H04L 63/14* (2013.01); *H04L 63/0272* (2013.01); *H04L 63/20* (2013.01)

(56) References Cited

U.S. PATENT DOCUMENTS

| | | | |
|---|---|---|---|
| 2007/0094493 A1* | 4/2007 | Ali | G06F 21/34 713/156 |
| 2007/0180031 A1* | 8/2007 | Stern | G06Q 10/107 709/206 |
| 2008/0005794 A1* | 1/2008 | Inoue | G06F 21/56 726/22 |
| 2009/0007081 A1* | 1/2009 | Lau | G06F 8/51 717/136 |
| 2010/0110465 A1 | 5/2010 | Ferlitsch et al. | |
| 2010/0317323 A1* | 12/2010 | Facemire | H04L 63/0492 455/411 |
| 2011/0314273 A1* | 12/2011 | Chu | H04L 63/105 713/153 |
| 2014/0283031 A1* | 9/2014 | Eksten | G06F 21/51 726/22 |
| 2015/0365427 A1* | 12/2015 | Ben-Shalom | G06F 21/55 726/23 |
| 2016/0117519 A1* | 4/2016 | Hashii | G06F 16/183 713/166 |

* cited by examiner

DATA PROTECTION CONTROL

TECHNICAL FIELD

The present invention relates generally to the field of data processing in a distributed environment, generally referred to as the "cloud", and more particularly control of movement of data and processes so as to achieve a protection that ensures that sensitive data and processes is not moved to untrusted domains.

More particularly, the invention relates to methods for tagging of data with a trust level and methods for data protection as well as apparatuses and computer products therefor.

BACKGROUND

Today data may reside at various databases connected in local or global networks. Similarly, service providers offering services performing various data processes, may reside at various locations in the networks. A network may be partitioned to create multiple distinct domains, which are mutually isolated so that packets can only pass between them via one or more gateways or routers. An example of such a domain is a virtual local area network, virtual LAN or VLAN. Inside a domain, a process and data is considered as trusted, whereas data originating outside the domain or with unknown source is considered as untrusted.

For different reasons, an entity requesting a service may desire to process data outside a domain; the requested service does currently not exist within the domain or is performed more efficiently or cheaper outside the domain.

Thus, an increasing amount of data processing is performed in the so-called cloud, i.e. in data centers around the globe with no concern or control of the data flow of data; which data may be sensitive. From the service requester's point of view, the important issue for a cloud provider is to create an illusion of unlimited computing resources that never fails; how and where those resources are physically manifested is of less importance.

When considering moving to cloud computing, many customers who are handling sensitive data, e.g. hospitals, banks, schools, and governmental institutions, are faced with legal and practical issues of not having control of how and where data is processed and stored in the current cloud offerings from various players (such as Amazon™, Google™, and Microsoft™).

SUMMARY

It is an object of some embodiments to solve or mitigate at least some of the above or other disadvantages.

In view of the problems mentioned above, there is a need for a mechanism to ensure that data has a defined trust level, preferably a number of trust levels. The trust levels enable control of data flow in and out of a domain.

Further, there is a need for a mechanism to move data in and out of a domain if trust level requirements are not met. Also, the trust level of data elements may be adjusted by transformation of the data.

Further, there is a need for a mechanism to move processing services between domains, as an alternative to move data.

According to a first aspect, this is achieved by a method for tagging of data with a trust level. The method comprises configuring a data analysis policy for mapping data elements to one of a number of trust levels; receiving a data flow; inspecting the data flow and identifying data elements to be tagged; for a data element to be tagged, analyzing the data element and mapping it to a trust level according to the data analysis policy; and adding the mapped trust level to the data element.

The data element may be a set of data packets or a single data packet.

The mapping may be based on semantic knowledge and content of the data element and/or the originating address and/or the destination address.

The mapped trust level may be added as metadata or embedded.

According to a second aspect, this is achieved by an apparatus configured to carry out the method as mentioned above.

The apparatus may for example be incorporated a data producer, a gateway, a network router or a trust proxy.

A third aspect is method for data protection, comprising: within a domain as defined by a boundary within which controlled trust levels prevail, starting a service request with associated data to be processed; inspecting a trust level of the data; locating a processing unit having an associated trust level;

if the processing unit is located within the domain, sending the data to the processing unit for processing;

if the processing unit is located outside the domain, and i. if the processing unit has a trust level no less than the trust level of the data, sending the data out from the domain to the processing unit for processing; or ii. if the processing unit has a trust level less than the trust level of the data, configuring the service inside the domain and sending the data to the processing unit configured inside the domain for processing; or iii. if the processing unit has a trust level less than the trust level of the data, downgrading the trust level of the data to be equal or less than the trust level of the processing unit, and sending the downgraded data out from the domain to the processing unit for processing.

Suitably, the selection between configuring the service inside the domain and downgrading the trust level of the data depends on the service, data requirement and type of downgrade.

In some embodiments, configuring the service inside the domain comprises duplicating the service, e.g. using a docker container or a virtual machine.

In some embodiments, configuring the service inside the domain comprises moving the service inside the domain.

In some embodiments, the trust level of the data is downgraded by transforming the data, e.g. by removing sensitive data components.

In some embodiments, the trust level of the data may further be upgraded to be equal with the original trust level, e.g. by recombination with removed data components.

The processed data may be received within the domain or be forwarded outside the domain.

A fourth aspect is an apparatus configured to carry out the method as mentioned above.

The apparatus may for example be incorporated in a gateway or a network router.

Suitably the apparatus is incorporated in a gateway implemented on a policy platform as part of a cloud infrastructure.

A fifth aspect is a computer program product comprising a computer readable medium, having thereon a computer program comprising program instructions, the computer program being loadable into a data-processing unit and adapted to cause execution of the methods mentioned above, when the computer program is run by the data-processing unit.

Among the advantages of some embodiments one may mention that it is ensured that sensitive information does not leave a trusted domain, with limited impact on offered services.

By tagging the data with a trust level, it is possible to ensure that outgoing data is only sent to destinations meeting this requirement.

Furthermore, through service duplication, service migration, or trust downgrading, it is possible to continue to offer the service even though the trust level is not (initially) met.

BRIEF DESCRIPTION OF THE DRAWINGS

Further objects, features and advantages will appear from the following detailed description of embodiments, with reference being made to the accompanying drawings, in which.

DETAILED DESCRIPTION

It should be emphasized that the term "comprises/comprising" when used in this specification is taken to specify the presence of stated features, integers, steps, or components, but does not preclude the presence or addition of one or more other features, integers, steps, components, or groups thereof.

The term "service" is generally meant to include any process, especially for processing data by a processing unit, computational unit or actor in actor based programming. The term "trusted domain" is generally meant to include a domain or zone within which all data sources and processes are trusted.

The term "receiver" is generally meant to include the entity receiving the processed data, which can be the original service requester or an entity at some other destination.

Figure 1:
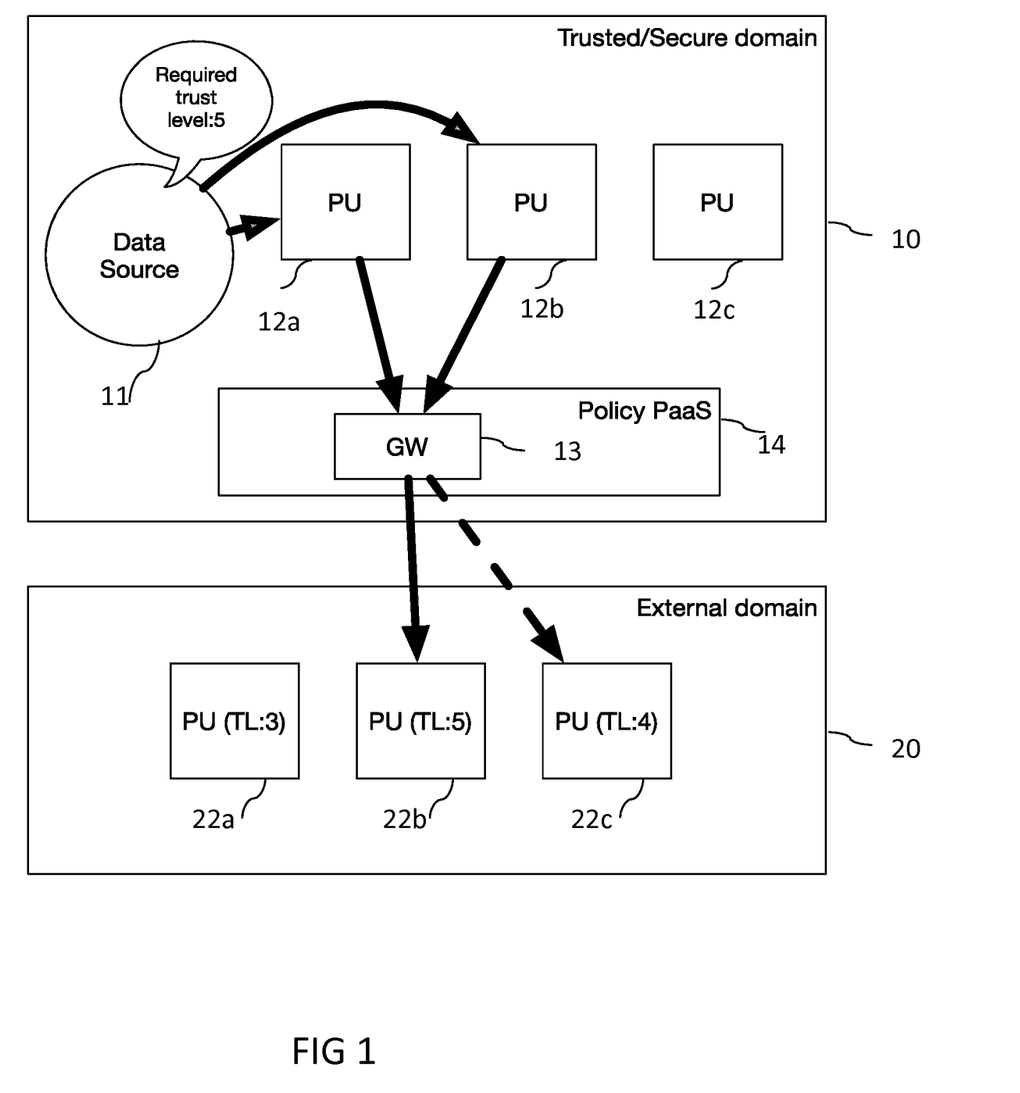
FIG. 1 is a schematic drawing of a cloud computing environment and movement of data according to embodiments of the invention.

A typical cloud computing environment is shown in FIG. 1. There is a trusted or secure domain 10 and an external domain 20. Inside the trusted domain 10, data is produced by data sources 11 which are trusted and for example may be databases and sensors. Services, that in general are requested to process data, are performed by processing units 12a-c. The services may be offered by service providers controlling one or more processing units 12a-c. A gateway 13 is configured to control movement of data in and out of the trusted domain 10. In accordance with embodiments of the invention, the gateway 13 is implemented on a policy platform 14 as part of a cloud infrastructure (PaaS, platform as a service).

The external domain 20, in other words everything outside the trusted domain 10, also comprises processing units 22a-c, albeit with possible different trust levels. The external domain 20 may also contain data sources (not shown).

Within a given trusted domain 10—which could be a geographically co-located datacenter, a VLAN, or some other domain with a common view of access and authorization—data can, and should, be permitted to move freely.

The data sources 11 are the origin of data in the system, and whenever data is produced, it is tagged with the level of trust required of processing units handling it. If the data not is sensitive, the data may be left untagged or tagged with trust level zero (0). Otherwise the data is tagged with positive trust levels according to embodiments of the invention. Some examples of data sources:
- a database where each query result has the required trust level as metadata
- a sensor where each measurement or data packet has the required trust level as metadata or embedded in the data
- a digital (video) camera where the trust level is embedded in the image or stored in metadata
- a network device where each packet (e.g. TCP) is given a trust level.

Adding trust level to data can be made in software, such as a camera embedding trust level in an image or a database reply, or in hardware, e.g. a router adding trust level to each outgoing IP packet.

Within the trusted domain 10, the data sources 11 are configured to 'tag' data produced with a 'required trust', that is a specific trust level according to embodiments of the invention.

The security gateway 13 is configured to inspect the data and determine if the required trust level of possibly outgoing data matches the trust level of the destination.

A security gateway can be a network router configured to inspect all outgoing packets and match the required trust level of each packet with the known trust level of the destination.

A security gateway can be a network router configured to inspect all outgoing packets and match the required trust level of each packet with the known trust level of the network between itself and the destination.

A security gateway can be configured with a data analysis policy that is based on semantic knowledge of the data, allowing the gateway 13 to determine trust on a higher level, such as inspecting an image for trust level.

In a first general example of the invention, a service request is started by a service requester (not shown) with associated data inside the trusted domain 10 to be processed. The receiver of the results (not shown) may reside within or without the trusted domain 10. However, the wanted service does not exist within the domain, at least not initially. Thus, a search for the service is made outside the trusted domain 10 and a destination of the service is located. To cooperate with embodiments of the invention, the destination should have a trust level assigned to it, and the trust level should be known to the gateway 13.

A data source could alternatively be located in another (different) trust domain with another security gateway determining if the destination of data has a sufficient trust level. The trust level of the destination will then include the trust level of the transport.

As mentioned above, all data passing outside of the trusted domain 10 is required to go via the gateway 13. The gateway 13 checks the required trust level versus the trust level of the destination. If the destination is of a lower trust level than required, there are a number of possibilities:

1. The data is prevented from leaving the trusted domain, and nothing further is done
   a. The internal or external resource that originated the service request could be notified of the error.
   b. A note could be made in an internal audit log for future reference.
2. However, generally it is preferred that the task is completed. Then, the options are
   a. If possible, the service is (temporarily) duplicated within the trusted domain, and only the result is reported to the original service requester (provided the required trust of the result is lower than that of the original data.)
   b. If possible, the external service could be migrated to within the trust zone, thereby gaining a higher level of trust. Once the computation is complete, the service could either stay within the zone, or migrate back to where it came from.
   c. The data is transformed into a form with lower trust requirements.

Detailed embodiments of the invention are described below.

With reference again to FIG. 1, it is assumed that a service request is started inside the trusted domain 10 with associated data to be processed, in this example with a required trust level 5. The data with the defined trust level arrives at a security gateway 13. The gateway 13 matches the trust level of the data with the known trust level of the destination, where data is to be sent for processing. It can also be the case that the outside network itself has a trust level, e.g. if the destination is a trust zone on the same local area network (LAN). Then, the outside network may have a higher trust level than if the destination is only reachable over the internet.

In a first alternative, the security gateway 13 inspects the data and determines that the trust level of the destination service provider has a trust level no less than the trust level of the outgoing data. Thus, the data may be sent out from the domain to the service provider for processing.

Data originating from the data source 11 with a required trust level 5 may be sent to processing unit 12a or processing unit 12b, and then on through the gateway 13, to the external processing unit 22b, also having the required trust level 5. The routes are shown with the solid arrows. Data originating from the data source 11 may also be sent directly to the external processing unit 22b via the gateway 13.

In a further alternative, the security gateway 13 inspects the data and determines that the trust level of the destination service provider has a trust level less than the trust level of the outgoing data. Thus, the data should not be sent out from the domain as the data is more sensitive and the destination service provider does not meet the required trust level. A simple alternative in this case would be that the data is simply not sent. This is the easiest solution, but can lead to unmet Service Level Agreements (SLA) or Service Level Objectives (SLO), lost revenue, and other failures. For example, the external processing unit 22c only has the trust level 4 and is not selectable, as shown with the dashed arrow.

Instead, in embodiments of the invention, to balance the trust level of the data and the service, either the trust level of the service is raised or the trust level of the data is lowered.

One alternative to raise the trust level of the service is to arrange it inside the trusted domain 10. If the data is being sent to an external service which can be duplicated and started elsewhere, for example if the data can be analyzed in isolation, without having access to massive amounts of data or resources not available within the trust zone, the necessary services may be downloaded and/or installed inside the trusted zone 10 and the data can reach the now trusted destination. If necessary, the result can then, if allowed by the trust requirements, be delivered to where the original service would have delivered it.

This may be the preferred case when the application is based on e.g. docker containers or virtual machines which can be cloned and started elsewhere. In this way a copy with the required trust level is configured inside the trusted domain. The copy may be deleted after use.

For lightweight virtualization such as actor based programming, where a computational unit can be serialized and migrated elsewhere, the preferred solution is to migrate those parts of the application requiring access to sensitive data to inside the trust zone. This can be done dynamically and almost seamlessly. In the case where data is located in several different trust zones with differing trust levels, without common trust, it may be that the computational units, actors, move between the trust zones (not shown).

Figure 2:
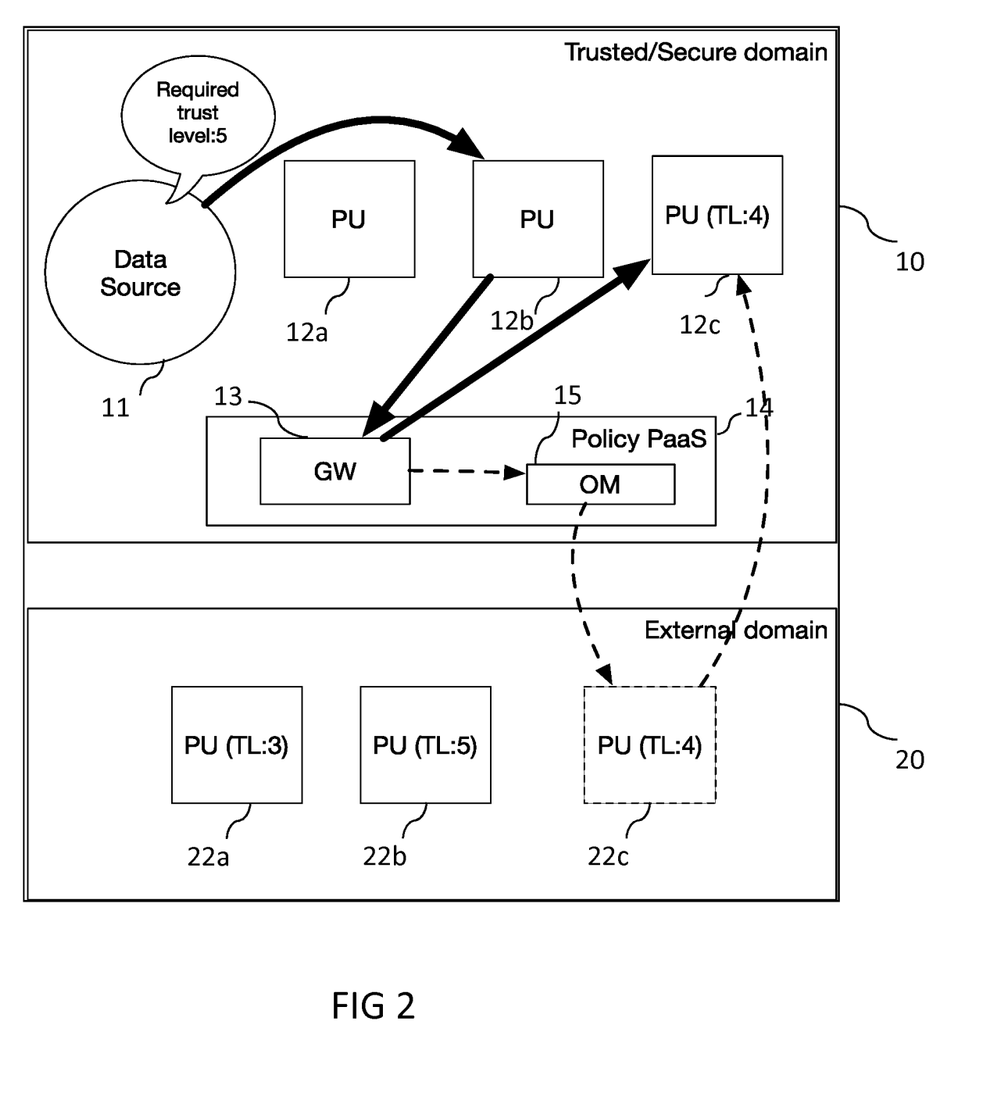
FIG. 2 is a schematic drawing of a cloud computing environment and movement of data and services according to embodiments of the invention.

With reference to FIG. 2, it is assumed that the trust level of the destination processing unit 22c has a trust level 4 which is less than the trust level 5 of the outgoing data from data source 11. Anyway, it is desired to use processing unit 22c. This may be because of considerations of efficiency, time savings or cost. In this case, the gateway 13 instructs an operations manager 15 (OM) to move the operations performed by the untrusted processing unit 22c inside the trusted domain 11 as shown with the dashed arrows to the processing unit 12c. The service of the processing unit 22c now exists as a copied or moved service of a processing unit 12c inside the trusted domain 10. Even though the original trust level of the processing unit 22c was 4, the data may be sent to the processing unit 12c as it is now residing inside the trusted domain 10 and inherently trusted.

Another alternative is to lower or downgrade the trust level of the data. For some data, it may be that it can be transformed into a form with lower required trust. For example, anonymizing patient information in a hospital database may lower the required trust, allowing the data to move outside the trusted zone. This of course presupposes that the destination can perform the requested service with the transformed data.

If the service request is better served by having full access to the sensitive data then it is preferred not to transform the data. For example, the downgrade of the data may be time consuming and/or there is a lot of data to process, or the service is more accurate with full access. Thus, whether or not to downgrade or downgrade the trust level or move the service, may depend on the service, the service's data requirement and type of downgrade. Take for example the case with room temperature, where e.g. daily measurements might be replaced with the average over a longer period of time. If the service is calculating energy consumption for each day of a month, then the former will give much more information.

The trust level of the processed data may be reset to be equal with the original trust level, e.g. by recombination with removed data components. This is possible if the removed information can be reconstructed in the receiver, for example, if two services have access to a common database (or have a pre-shared set of data) from which the missing information can be restored. In the case of medical records, the patient's identifying data may be replaced by an identifier and is never sent between services, but both services have access to a mapping between the identifier and the missing data.

Figure 3:
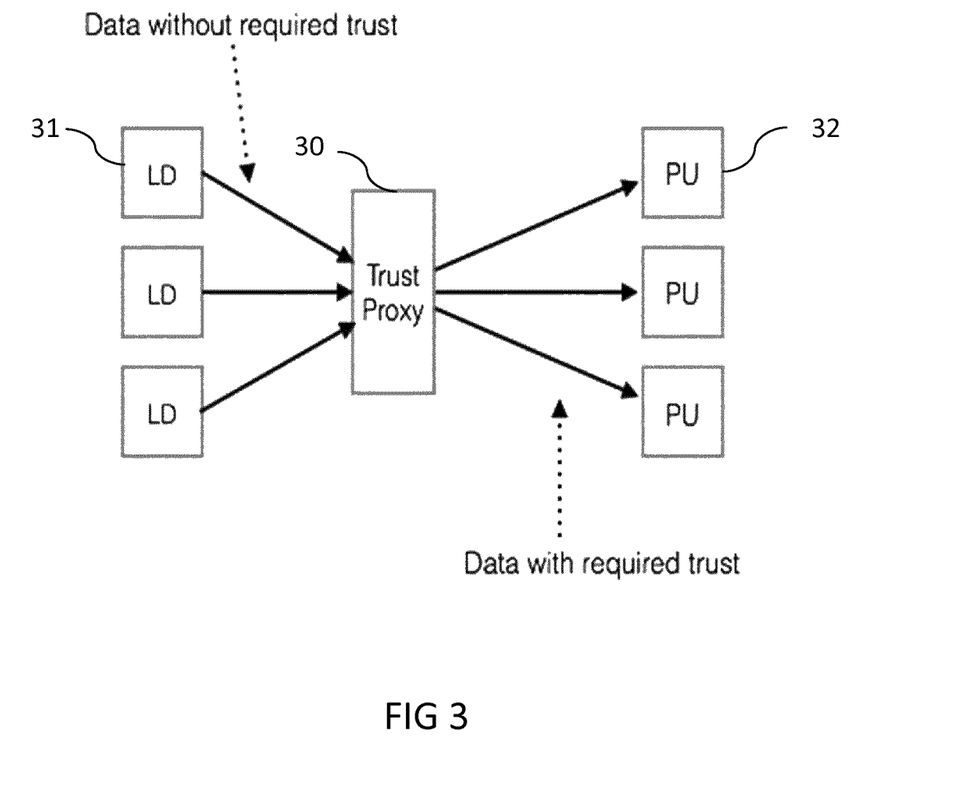
FIG. 3 is a schematic drawing of a device for tagging data with trust levels according to embodiments of the invention.

It is foreseen that some data sources are not capable of registering the trust level, due insufficient computational power, or not configurable to handle this (e.g. a legacy device from before the technology was introduced). According to embodiments of the invention, this can be handled by a proxy device 30. The proxy adds the required trust level to the data, either embedded or as metadata.

A trust proxy could be a network router or switch configured to add required trust to data arriving on a certain port or leaving the switch on a certain port.

A trust proxy could be a network router or switch configured to add required trust to data arriving from a certain address or with a certain address as destination.

A trust proxy could be a Bluetooth™ gateway, configured to add required trust to data arriving from certain devices/addresses or leaving for certain devices/addresses.

Figure 4:
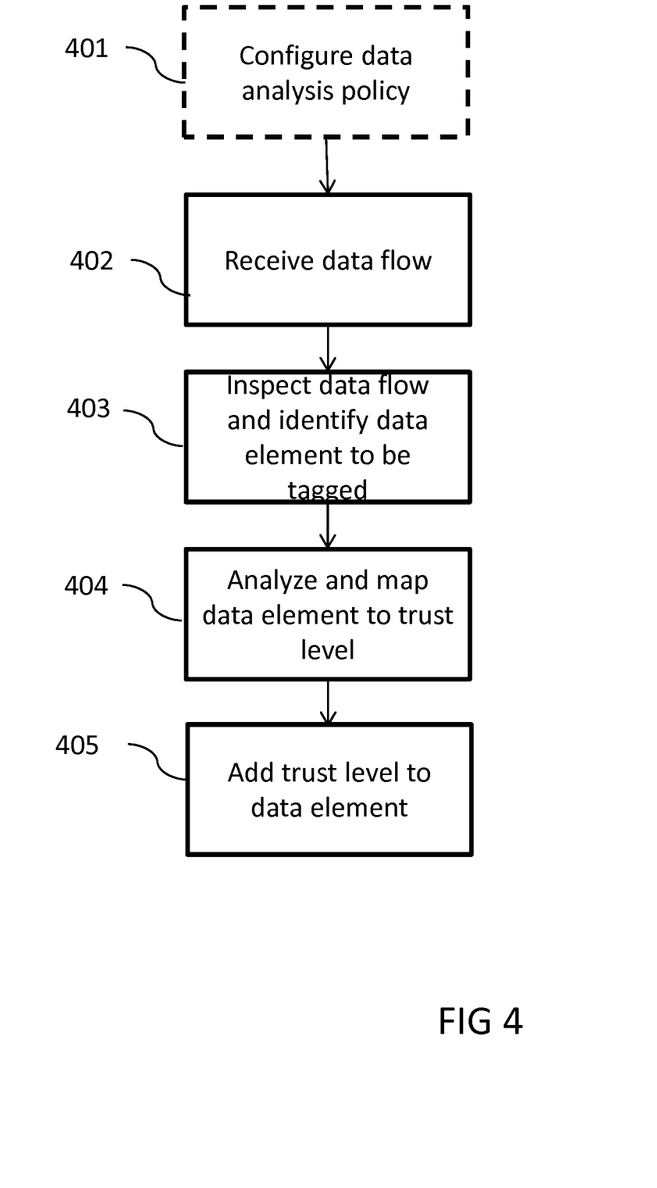
FIG. 4 is a flow chart of a process for tagging data according to embodiments of the invention.

FIG. 3 shows how data from legacy devices (LD) 31 without the capability of supplying a trust level, is routed via a trust proxy 30 according to embodiments of the invention. A corresponding flow chart is seen in FIG. 4. The trust proxy 30 is configured with a data analysis tool and policy to carry out a mapping of the data and a specific trust level according to the policy and tagging the data with the determined trust level. The policy is suitably defined in terms of geographical location, content sensitivity, time, source and destination (sender/receiver) and combinations of these. The data analysis policy is configured in step 401 which is suitably done in advance separately from the tagging.

The trust proxy 30 receives a data flow in step 402. It inspects the incoming data flow and identifies data elements to be tagged in step 403. The data element may be a set of data packets, e.g. a file, or a single data packet. For example an image file may be analyzed as a whole using semantic knowledge of the data. The data element is analyzed in accordance with the data analysis policy and mapped to the calculated trust level in step 404. When the data element is mapped to a suitable trust level, it is tagged with the trust level in step 405, added either as metadata or embedded.

Some examples of how data is tagged:

*Where (geographical location)

In a company, surveillance cameras located in the lobby of the building will likely require a lower level of trust than the ones in the laboratory. Similarly, emails sent from the receptionist desk will usually not contain sensitive information as often as the ones sent from the laboratory.

*What (content sensitivity)

At a hospital, databases containing medical records will usually require a higher level of trust than ones containing employee time reports, or building maintenance schedules.

*When (time based)

The quarterly report of a company requires a higher trust level up until the day of its release, after which it is public information and requires no trust level (or zero).

*Whom (sender/receiver)

Emails sent from a patent engineer's email account has a higher likelihood of containing sensitive information than, e.g., emails sent from the receptionist's. Consequently, the former will have a higher default level of required trust. Analogously, emails sent to a patent engineer are more likely to contain sensitive information than emails sent to the receptionist. This knowledge is already available to many email clients, and according to embodiments of the invention, it is possible to assign a default trust level to positions/people and thus warn, or prevent, emails from being sent unencrypted from and to certain people in the organization.

In order to achieve data protection according to embodiments of the invention, at least two trust levels should be provisioned. It is however, advantages to provide a finer granularity with even more trust levels, for example 0 as untrusted and levels 1, 2, 3 . . . for higher trust levels. The specific mapping of the trust level values in accordance with a data protection policy is generally implementation specific and may be implemented by a skilled person.

It is contemplated that the trust levels need not be static, but may be changed if the need should arise. Then, a trust proxy mechanism according to embodiments of the invention with a redefined policy may be used.

The trust proxy 20 may be implemented as a stand-alone entity or incorporated for example in a data producer, a gateway, and a network router.

Figure 5:
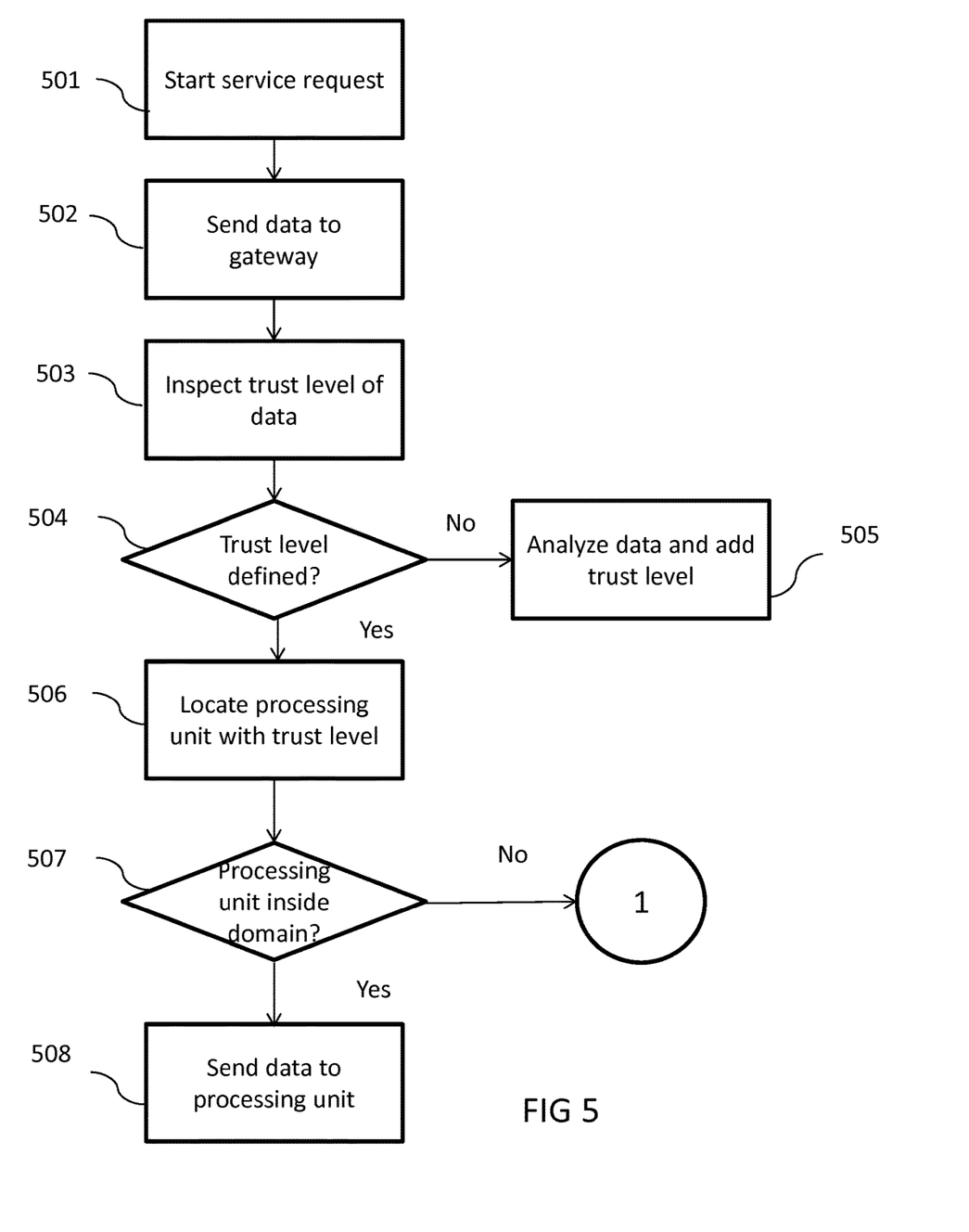
FIG. 5 is a first part of a flow chart of a process for data protection according to embodiments of the invention.
Figure 6:
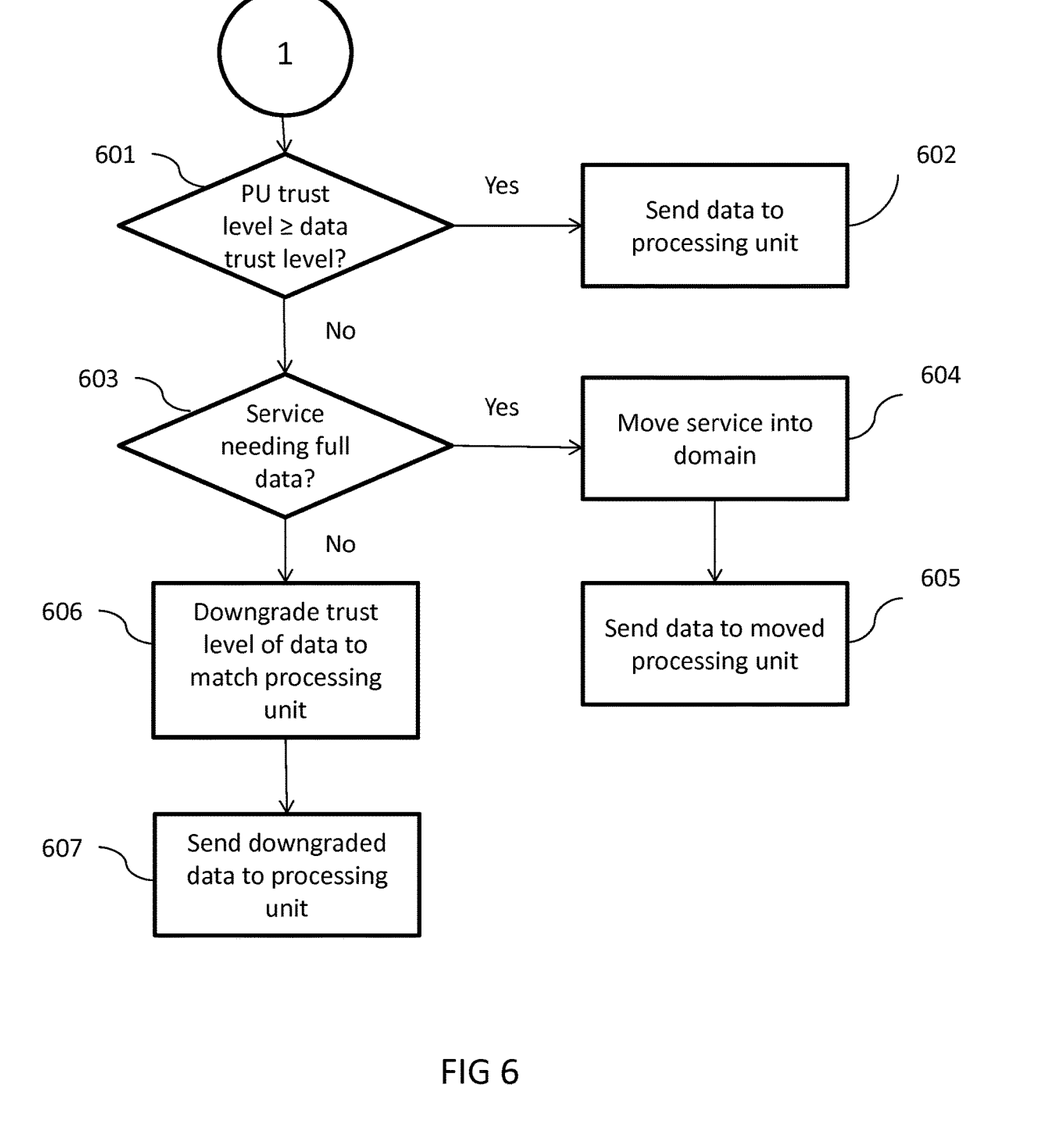
FIG. 6 is a second part of a flow chart of a process for data protection according to embodiments of the invention.

The process according to embodiments of the invention is outlined in the flowcharts of FIGS. 5 and 6.

In step 501 a service request is started. In step 502 data is sent to the gateway which inspects the trust level in step 503.

If no trust level is defined, No-branch from decision step 504, data is sent e.g. to a trust proxy, and a trust level is added in step 505.

If a trust level is defined, Yes-branch from decision step 504, a wanted processing unit with a defined trust level is located in step 506. The processing unit may be inside or outside the original trusted domain, and its trust level may be higher or lower than required.

If the processing unit is inside the original trusted domain, Yes-branch from decision step 507, the data is sent to the processing unit in step 508.

If the processing unit is outside the original trusted domain, No-branch from decision step 507, the process continues (see FIG. 6) with a decision 601 whether the trust level of the processing unit is no less than ($\geq$) the trust level of the data. If Yes, the data is sent to the processing unit in step 602.

If No, (the trust level of the processing unit is less than trust level of the data), a new decision 603 is taken whether the requested service need the full data. In other words, must the data be unchanged to perform the requested service?

If Yes, the service is moved into the trusted domain in step 604, according to one of the embodiments of the invention described above, and the data is sent in step 605 to the processing unit now residing at least temporarily inside the trusted domain.

If No, (full data not required), the trust level of the data is downgraded to match the trust level of the processing unit in step 606. Thus, sensitive information from the data is removed such that the trust level is equal (or possibly lower, if suitable) than the trust level of the wanted processing unit.

Then, the downgraded data is sent to the processing unit in step 607.

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus, such as a gateway, a network router, a trust proxy or a network node, comprising circuitry/logic or performing methods according to any of the embodiments.

Figure 7:
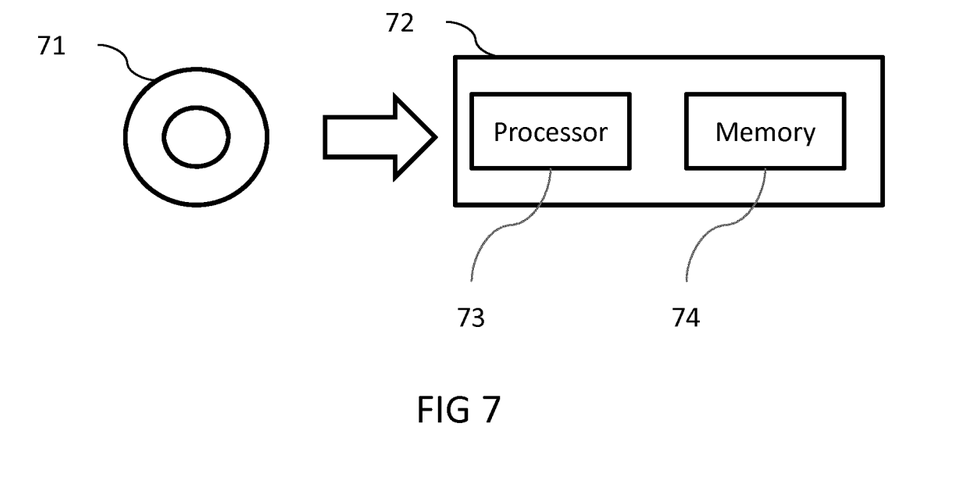
FIG. 7 is a schematic drawing illustrating a computer readable medium according to some embodiments.

According to some embodiments, a computer program product comprises a computer readable medium such as, for example, a diskette, a USB-stick, a plug-in card, an embedded drive, or a CD-ROM as illustrated by 71 of FIG. 7. The computer readable medium 71 may have stored thereon a computer program comprising program instructions. The computer program may be loadable into a data-processing unit (processor) 73, which may, for example, be comprised in a device 72 such as a gateway, a network router, a trust proxy or a network node. When loaded into the data-processing unit 73, the computer program may be stored in a memory 74 associated with or integral to the data-processing unit 73. According to some embodiments, the computer program may, when loaded into and run by the data-processing unit, cause the data-processing unit to execute method steps according to, for example, any of the methods shown in FIGS. 4, 5 and 6.

In summary, the invention provides a number of advantages. By providing a policy enforcement and means to control how data flows and where processing is performed a balance is struck between the benefits of cloud processing and the requirements on how sensitive data is handled. Instead of simply denying the access to a compute resource outside the trusted domain (with resulting problems), the compute resource may be temporarily moved inside trusted domain according to embodiments of the invention. The possible penalties of temporarily moving processing inside the trusted domain are further alleviated by providing an actor/dataflow based lightweight virtualization mechanism. In an alternative, data may be protected by removing sensitive information, such that it may be sent out from the trusted domain for external processing.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all variations that fall within the range of the claims are intended to be embraced therein.

The invention claimed is:

1. A method for data protection, the method comprising:
   within a domain as defined by a boundary within which controlled trust levels prevail, starting a service request with associated data to be processed;
   inspecting a trust level of the data;
   locating a processing unit having an associated trust level;
   if the processing unit is located within the domain, sending the data to the processing unit for processing;
   if the processing unit is located outside the domain:
     if the processing unit has a trust level no less than the trust level of the data, sending the data out from the domain to the processing unit for processing; or
     if the processing unit has a trust level less than the trust level of the data, configuring the service inside the domain and sending the data to a processing unit configured inside the domain for processing; or
     if the processing unit has a trust level less than the trust level of the data, downgrading the trust level of the data to be equal or less than the trust level of the processing unit, and sending the downgraded data out from the domain to the processing unit for processing; and
   selecting between configuring the service inside the domain and downgrading the trust level of the data based on the service, a data requirement, and a type of downgrade.

2. The method of claim 1, wherein configuring the service inside the domain comprises duplicating the service.

3. The method of claim 1, wherein configuring the service inside the domain comprises moving the service inside the domain.

4. The method of claim 1, wherein the trust level of the data is downgraded by transforming the data.

5. The method of claim 4, further comprising subsequently upgrading the trust level of the data to be equal with the original trust level.

6. The method of claim 1, further comprising receiving the processed data within the domain.

7. The method of claim 1, further comprising forwarding the processed data outside the domain.

8. An apparatus for data protection, comprising:
   processing circuitry;
   memory containing instructions executable by the processing circuitry whereby the apparatus is operative to:
     within a domain as defined by a boundary within which controlled trust levels prevail, starting a service request with associated data to be processed;
     inspecting a trust level of the data;
     locating a processing unit having an associated trust level;
     if the processing unit is located within the domain, sending the data to the processing unit for processing;
     if the processing unit is located outside the domain:
       if the processing unit has a trust level no less than the trust level of the data, sending the data out from the domain to the processing unit for processing; or
       if the processing unit has a trust level less than the trust level of the data, configuring the service inside the domain and sending the data to a processing unit configured inside the domain for processing; or
       if the processing unit has a trust level less than the trust level of the data, downgrading the trust level of the data to be equal or less than the trust level of the processing unit, and sending the downgraded data out from the domain to the processing unit for processing; and
     selecting between configuring the service inside the domain and downgrading the trust level of the data based on the service, a data requirement, and a type of downgrade;
   wherein the apparatus is incorporated in a gateway or a network router.

9. The apparatus of claim 8, wherein the apparatus is incorporated in a gateway implemented on a policy platform as part of a cloud infrastructure.

10. A method for data protection, the method comprising:
within a domain as defined by a boundary within which controlled trust levels prevail, starting a service request with associated data to be processed;
inspecting a trust level of the data;
locating a processing unit having an associated trust level;
if the processing unit is located within the domain, sending the data to the processing unit for processing;
if the processing unit is located outside the domain:
if the processing unit has a trust level no less than the trust level of the data, sending the data out from the domain to the processing unit for processing; and
if the processing unit has a trust level less than the trust level of the data, configuring the service inside the domain and sending the data to a processing unit configured inside the domain for processing, wherein configuring the service inside the domain comprises one of duplicating the service and moving the service inside the domain.

11. An apparatus for data protection, comprising:
processing circuitry;
memory containing instructions executable by the processing circuitry whereby the apparatus is operative to:
within a domain as defined by a boundary within which controlled trust levels prevail, starting a service request with associated data to be processed;
inspecting a trust level of the data;
locating a processing unit having an associated trust level;
if the processing unit is located within the domain, sending the data to the processing unit for processing;
if the processing unit is located outside the domain:
if the processing unit has a trust level no less than the trust level of the data, sending the data out from the domain to the processing unit for processing; and
if the processing unit has a trust level less than the trust level of the data, configuring the service inside the domain and sending the data to a processing unit configured inside the domain for processing, wherein configuring the service inside the domain comprises one of duplicating the service and moving the service inside the domain; and
wherein the apparatus is incorporated in a gateway or a network router.

12. A method for data protection, the method comprising:
within a domain as defined by a boundary within which controlled trust levels prevail, starting a service request with associated data to be processed;
inspecting a trust level of the data;
locating a processing unit having an associated trust level;
if the processing unit is located within the domain, sending the data to the processing unit for processing;
if the processing unit is located outside the domain:
if the processing unit has a trust level no less than the trust level of the data, sending the data out from the domain to the processing unit for processing; and
if the processing unit has a trust level less than the trust level of the data, downgrading the trust level of the data to be equal or less than the trust level of the processing unit, and sending the downgraded data out from the domain to the processing unit for processing.

13. An apparatus for data protection, comprising:
processing circuitry;
memory containing instructions executable by the processing circuitry whereby the apparatus is operative to:
within a domain as defined by a boundary within which controlled trust levels prevail, starting a service request with associated data to be processed;
inspecting a trust level of the data;
locating a processing unit having an associated trust level;
if the processing unit is located within the domain, sending the data to the processing unit for processing;
if the processing unit is located outside the domain:
if the processing unit has a trust level no less than the trust level of the data, sending the data out from the domain to the processing unit for processing; and
if the processing unit has a trust level less than the trust level of the data, downgrading the trust level of the data to be equal or less than the trust level of the processing unit, and sending the downgraded data out from the domain to the processing unit for processing; and
wherein the apparatus is incorporated in a gateway or a network router.

* * * * *